United States Patent
Hackett et al.

(10) Patent No.: US 7,122,116 B2
(45) Date of Patent: Oct. 17, 2006

(54) WATER TREATMENT SYSTEM

(75) Inventors: Tony D. Hackett, Caldwell, ID (US); Samuel P. Kingrey, Caldwell, ID (US)

(73) Assignee: R-Kind Water Systems, Inc., Caldwell, ID (US)

( * ) Notice: Subject to any disclaimer, the term of this patent is extended or adjusted under 35 U.S.C. 154(b) by 344 days.

(21) Appl. No.: 10/786,269

(22) Filed: Feb. 24, 2004

(65) Prior Publication Data

US 2005/0183999 A1 Aug. 25, 2005

(51) Int. Cl.
*C02F 9/00* (2006.01)

(52) U.S. Cl. ............... 210/108; 210/202; 210/206; 210/257.1; 210/258; 210/259; 210/266

(58) Field of Classification Search ........... 210/85, 210/108, 172, 202, 205, 206, 257.1, 258, 210/259, 266, 275, 277, 290
See application file for complete search history.

(56) References Cited

U.S. PATENT DOCUMENTS

| | | | | |
|---|---|---|---|---|
| 3,655,054 A * | 4/1972 | Pansini | ............... | 210/206 |
| 4,202,768 A * | 5/1980 | De Longe et al. | ........... | 210/205 |
| 4,314,906 A * | 2/1982 | Dunn et al. | ................. | 210/754 |
| 4,643,831 A * | 2/1987 | Fletcher | ................ | 210/206 |
| 4,684,471 A | 8/1987 | Manojlovic | ................ | 210/665 |
| 5,147,530 A * | 9/1992 | Chandler et al. | ........... | 210/202 |
| 5,354,459 A | 10/1994 | Smith | .................. | 210/188 |
| 5,399,260 A * | 3/1995 | Eldredge et al. | ............ | 210/205 |
| 5,405,526 A * | 4/1995 | Sutera | ................. | 210/266 |
| 5,611,937 A | 3/1997 | Jarocki | ................. | 210/754 |
| 5,997,750 A | 12/1999 | Rozelle et al. | ............. | 210/744 |
| 6,103,108 A | 8/2000 | Kohlenberg | ............... | 210/120 |
| 6,312,588 B1 * | 11/2001 | Conrad et al. | ................ | 210/85 |
| 6,325,943 B1 | 12/2001 | Kohlenberg | ............... | 210/741 |
| 6,379,539 B1 | 4/2002 | Ubelhor | ................ | 210/104 |
| 6,913,691 B1 * | 7/2005 | Holler | ................ | 210/209 |
| 2003/0132167 A1 * | 7/2003 | Haase | ................ | 210/696 |

* cited by examiner

*Primary Examiner*—Christopher Upton
(74) *Attorney, Agent, or Firm*—Joseph W. Holland

(57) ABSTRACT

A water treatment system that includes a water storage tank fluidly connected to a water source through an inlet, a chlorination device fluidly connected to the water storage tank and the inlet, a media filter vessel at least partially contained within the water storage tank and a pump fluidly connecting the media filter vessel with the water storage tank. In a preferred embodiment of the present invention, the chlorination device includes a chlorination device configured as a chlorination vessel containing a chlorine tablet. Flow through the chlorination device is regulated to provide decontamination treatment. In a preferred embodiment of the present invention, the water treatment system includes a media filter vessel contained at least partially within the water storage tank and completely within a footprint or diameter of the water storage tank.

15 Claims, 3 Drawing Sheets

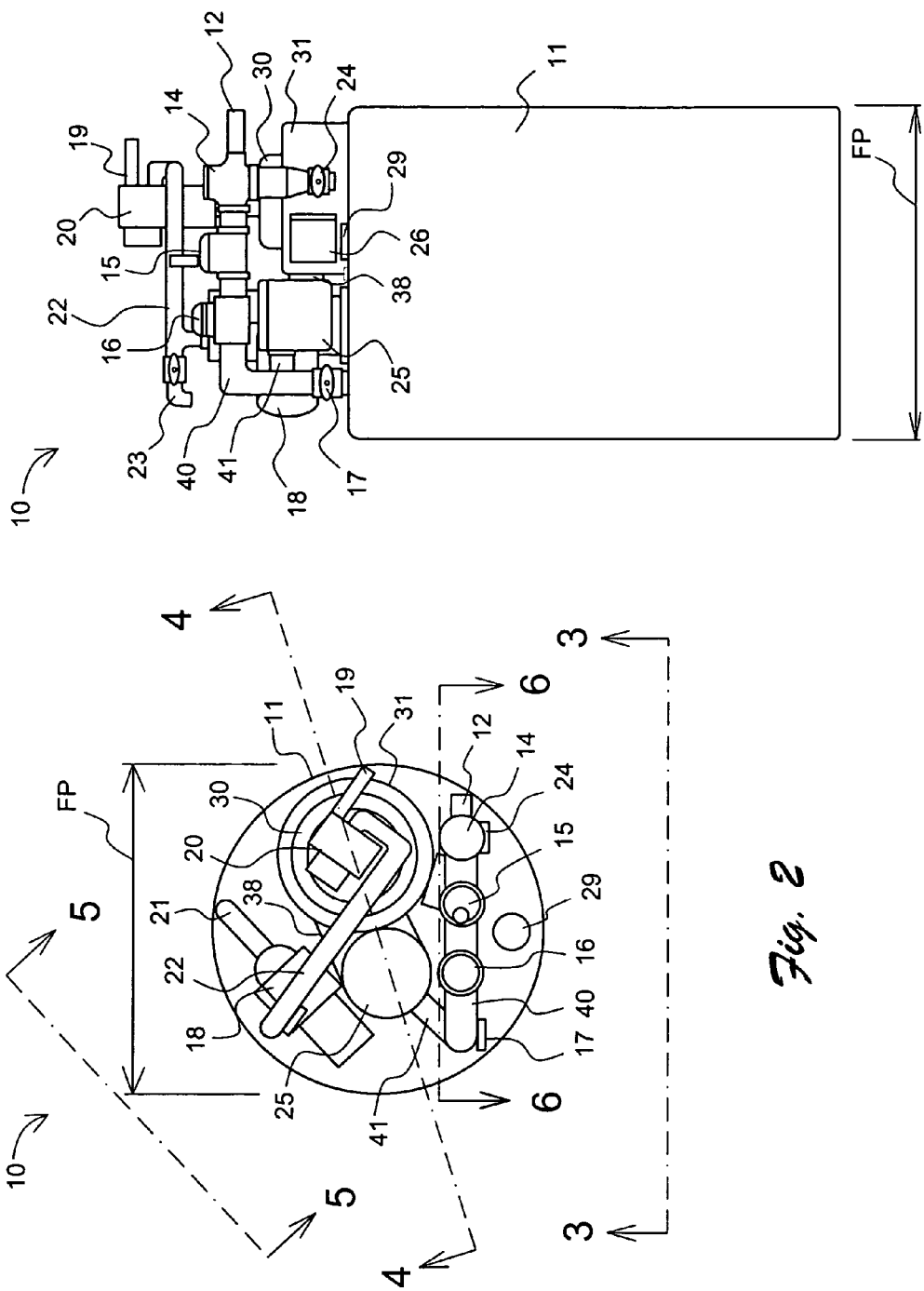

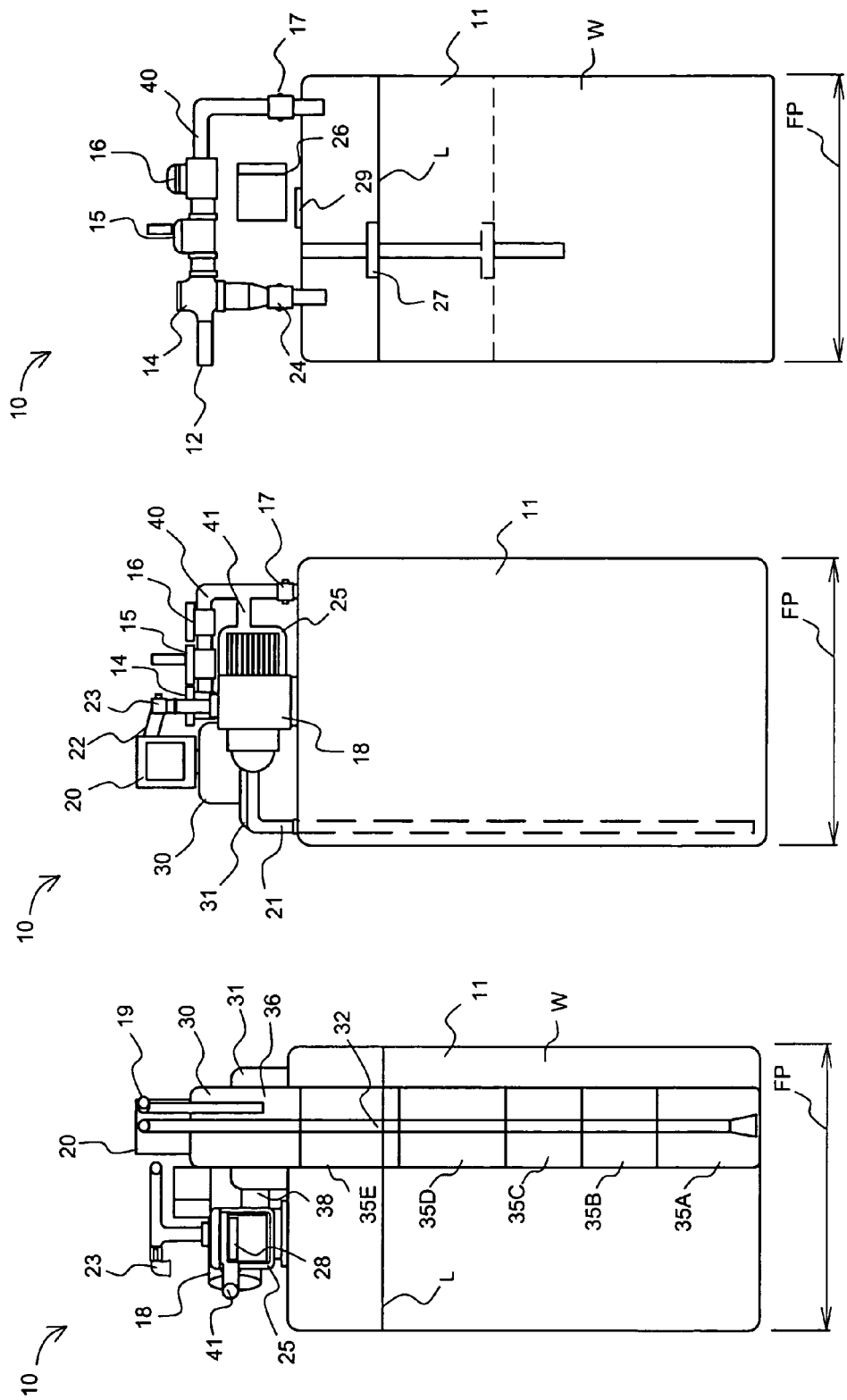

WATER TREATMENT SYSTEM

BACKGROUND OF THE INVENTION

1. Field of Invention

The present invention relates to the purification of drinking water and, more specifically, to a culinary water treatment system for reducing minerals and organisms in fresh water.

2. Background of the Invention

Water treatment systems for culinary water typically address either the problem of contamination or the problem of high mineral content separately. For instance, a variety of methods are employed for reducing contaminants to acceptable levels. These include the use of various disinfectants including chlorine, the use of positively-charged filtration systems, the use of reverse osmosis, the use of coagulants, the use of activated charcoal and activated carbon filters and the use of various filter media. Similarly, a variety of methods are employed for reducing unacceptable mineral content to improve the quality of drinking water. These include aeration, fogging and misting the water stream combined with filtration.

At least one attempt has been made to combine both decontamination and treatment for mineral content. U.S. Pat. No. 6,379,539 to Ubelhor entitled Point of Entry Water Treatment System discloses a point of entry water treatment system. Components mounted on a base frame are interconnected and provide a system and method for treating freshwater, including from a lake, river, well or cistern, to provide potable water. A pre-filter removes sediment and reduces turbidity, followed by chlorine disinfection of the water. In a final step water passes through an activated carbon filter to remove remaining free disinfectant and by-products resulting from the application of the disinfectant. Ubelhor teaches a system including at least three separate vessels, a sediment pre-filter, a mixing tank and a pressure tank.

It may be therefore desirable to provide a system and method for treating fresh water that includes a relatively cost efficient means for controlling the mixture of a disinfectant with the water. Advantage may also be found in a system that combines the processes of reducing water contaminants and undesirable mineral content concentrations to acceptable levels. Additionally, there may be advantage in combining the above functionality in an appliance having a footprint no greater than a footprint of the larges vessel involved in the process.

Therefore, it is an object of the present invention to provide a system and method for treating fresh water that includes a relatively cost efficient means for controlling the mixture of a disinfectant with the water. Another object of the present invention is to combine the processes of reducing water contaminants and undesirable mineral content concentrations to acceptable levels in a single appliance. It is also an advantage of the present invention to combine the processes of reducing water contaminants and undesirable mineral content concentrations to acceptable levels in an appliance having a footprint no greater than a footprint of the largest vessel involved in the process.

SUMMARY OF THE INVENTION

The present invention is directed to a water treatment system that includes a water storage tank fluidly connected to a water source through an inlet, a chlorination device fluidly connected to the water storage tank and the inlet, a media filter vessel at least partially contained within the water storage tank and a pump fluidly connecting the media filter vessel with the water storage tank. In a preferred embodiment of the present invention, the chlorination device includes a passive chlorination device configured as a chlorination vessel containing a chlorine tablet. Flow through the chlorination device is regulated to provide decontamination treatment. In a preferred embodiment of the present invention, the water treatment system includes a media filter vessel contained at least partially within the water storage tank and completely within a footprint or diameter of the water storage tank.

The present invention consists of the device hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

BRIEF DESCRIPTION OF THE FIGURES

FIG. 2 is a representative top view of a water treatment system according to one embodiment of the present invention;

FIG. 3 is a representative side view of a water treatment system according to one embodiment of the present invention;

FIG. 4 is a representative sectional view of a water treatment system according to one embodiment of the present invention;

FIG. 5 is a representative side view of a water treatment system according to one embodiment of the present invention; and FIG. 6 is a representative sectional view of a water treatment system according to one embodiment of the present invention.

DETAILED DESCRIPTION OF THE INVENTION

Figure 1:
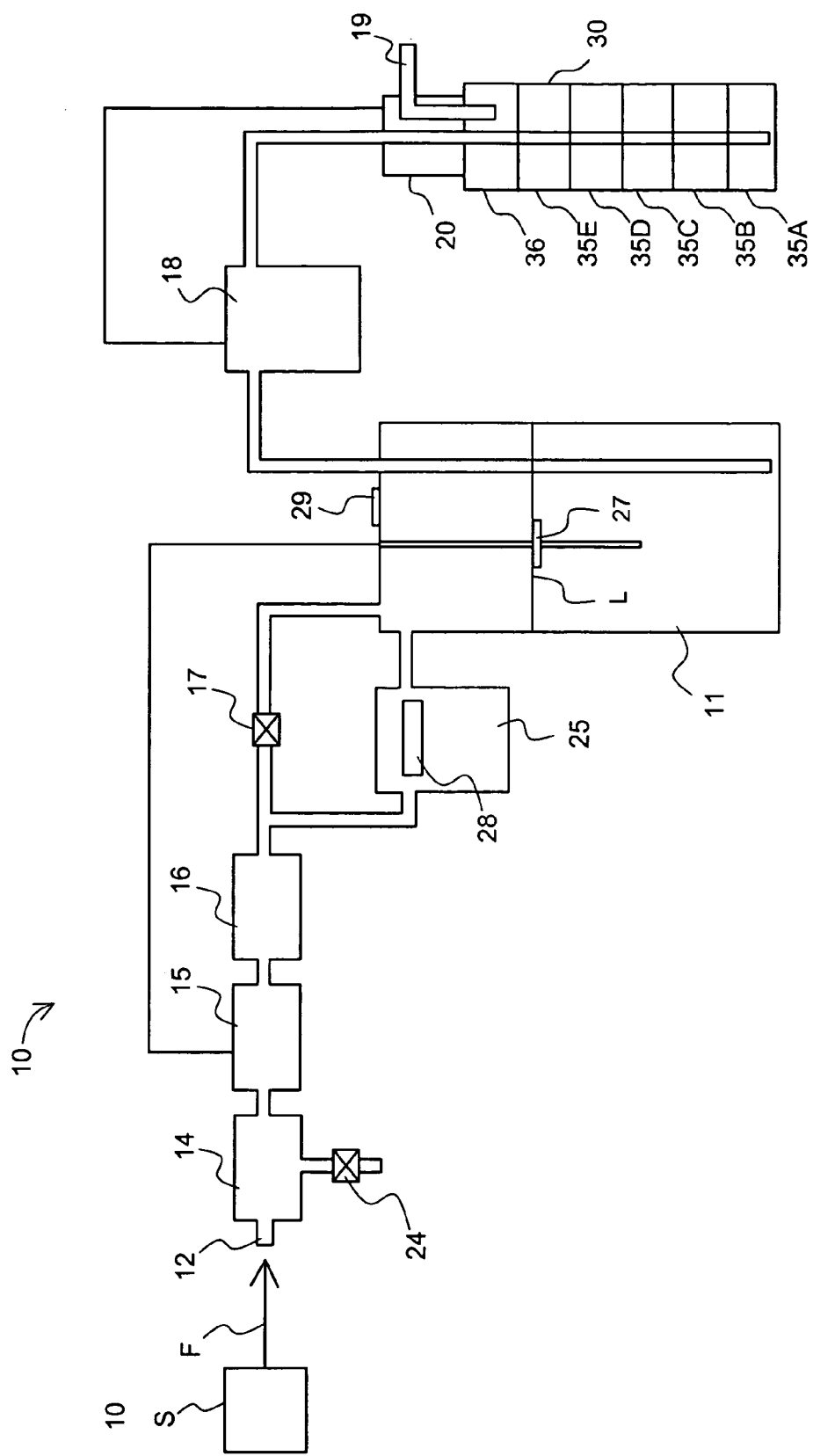
FIG. 1 is a schematic representation of a water treatment system according to one embodiment of the present invention.

Referring to FIGS. 1 through 6, water treatment system 10 is shown to advantage. FIG. 1 is a schematic representation of a water treatment system 10 according to one embodiment of the present invention. Water is provided to the system at source S, through inlet 12. Next, water passes through sediment filter 14. Sediment filter 14 may be "blown out" through valve 24. Flow through water treatment system 10 is regulated at an inlet stage by solenoid valve 15. When solenoid valve 15 is open water passes through an air charging device 16. In the preferred embodiment, air charging device 16 charges flow F with entrained air including oxygen, $O_2$. When oxygen combines with iron and manganese ions, these metals convert from a dissolved state in a precipitated form. Ferric and manganese ions are removed in a subsequent filter step.

Flow F from air charging device 16 is directed next through chlorination basket 25. Chlorination basket 25 includes a chlorination tablet 28, which in the embodiment shown is a 76.2 millimeter, (3 inch), calcium hypochlorite tablet. Chlorination tablet 28 erodes at a consistent rate, releasing a controlled amount of chlorine into flow F. The higher the rate of water flow F, the more chlorine delivered to water treatment system 10. Flow F through water treatment system 10 is regulated at a chlorination stage through chlorination basket 25 by valve 17. By regulating flow at valve 17, volume and flow through chlorination basket 25, and therefore chlorine concentration are regulated. Treated water from chlorination basket 25 combines with unchlorinated water in flow F, achieving a regulated level of available chlorine reducing water contaminant concentrations to acceptable levels. Treated water from chlorination basket 25 is directed to storage tank 11 through outlet 38, seen in FIGS. 2, 3 and 4 that is fluidly connected to housing 31 of water treatment system 10. It is also believed that the entrainment of air including oxygen, $O_2$, at air charging device 16 provides an environment in which decontamination through the chlorination process, is achieved with greater efficiency and therefore with decreased levels of chlorine use.

Flow F from an outlet side of valve 17 is directed next to storage tank 11. As can be seen in FIG. 1, water level L in storage tank 11 is regulated by float 27. When water level L reaches a selected point, solenoid valve 15 closes and flow F ceases. As water level L drops below a selected level, solenoid valve 15 opens and flow F commences or resumes.

Flow F through outlet 19 is controlled via control of pump 18 by control valve 20 as demand for potable water is created down stream from outlet 19. In a preferred embodiment of water treatment system 10, control valve 20 includes a processing device including a memory device conductively connected to the processing device for storing system configuration and operation data and an input device conductively connected to the processing device for inputting system configuration and operation data. The system configuration and operation data further comprises a standard operations command and a backflush command. In the embodiment shown, control valve 20 is a Clack WS1TC programmable clock control valve manufactured by the Clack Corporation of Windsor, Wis. In addition to regulating operation of pump 18, control valve 20 also controls operation of a filter backwash function described below. As demand for potable water is created down stream from outlet 19, control valve 20 causes pump 18 to energize, drawing water from storage tank 11 and directing a flow from the discharge side of pump 18 to the bottom of media filter vessel 30.

Water rises through media 35A through 35E contained in media filter vessel 30. In water treatment system 10 shown in FIG. 1, media 35A includes a 152.4 millimeter, (approximately 6 inch), layer of gravel, media 35B includes a 127 millimeter, (approximately 5 inch), layer of MTM Green Sand, media 35C includes a 381 millimeter, (approximately 15 inch), layer of activated carbon, media 35D includes a 381 millimeter, (approximately 15 inch), layer of Corosex pH Booster, and media 35E includes a 152.4 millimeter, (approximately 6 inch), layer of filter aggregate. Alternately, media 35A includes a layer consisting of 11.34 kilograms, (approximately 25 pounds), of gravel, media 35B includes a layer consisting of 5.44 kilograms, (approximately 12 pounds), of MTM Green Sand gravel, media 35C includes a layer consisting of 9.07 kilograms, (approximately 20 pounds), of activated carbon, media 35D includes a layer consisting of 0.91 kilograms, (approximately 2 pounds), of Corosex pH Booster and media 35E includes a layer consisting of 4.55 kilograms, (approximately 10 pounds), of filter aggregate. In either case, a freebore 36 equaling 400–450 millimeter, (approximately 16 to 18 inches), is desired above media 35E. A pressurized flow of water F from water treatment system 10 is output at outlet 19.

Referring to FIGS. 2 through 6, one preferred embodiment of water treatment system 10 is shown to advantage which combines the processes of reducing water contaminants and undesirable mineral content concentrations to acceptable levels in an appliance having a footprint FP no greater than a footprint of the largest vessel involved in the process, in this case, storage tank 11. Referring initially to FIG. 2 it will be seen that all components of water treatment system 10, including inlet manifold 40 including inlet 12, sediment filter 14, solenoid valve 15, air charging device 16, valves 17 and 24, chlorination basket 25, pump 18, suction pipe 21, discharge piping 22, valve controlled spigot 23, control valve 20 and media filter vessel 30 are all located within a footprint FP of storage tank 11. Footprint FP is substantially equal to a diameter of storage tank 11.

As shown in FIGS. 2, 3, 5 and 6, water treatment system 10 includes inlet 12 fluidly connected to sediment filter 14, solenoid valve 15 and air charging device 16. As seen in FIGS. 3 and 6, sediment filter 14, solenoid valve 15 and air charging device 16, together with their respective interconnecting piping form inlet manifold 41, which is mounted to and fluidly communicates with storage tank 11 through system piping including valves 17 and 24. Valve 24 controls flow through sediment filter 14 to storage tank 11, while valve 17 regulates flow to storage tank 11 from chlorination basket 25. As seen in FIGS. 2–5, chlorination basket 25 fluidly communicates with inlet manifold 41, through chlorination inlet 41. As seen in FIG. 4, chlorination basket 25 includes chlorination tablet 28 which erodes by action of water passed through chlorination basket 25, seen in FIGS. 2, 3, 4 and 5. Referring to FIG. 6, water level L in storage tank 11 is regulated by float 27. As previously discussed with reference to FIG. 1, and again with reference to that figure, as water level L reaches a selected point, solenoid valve 15 closes and flow F ceases. As water level L drops below a selected level, solenoid valve 15 opens and flow F commences or resumes.

Referring to FIGS. 2 through 5, water treatment system 10 includes pump 18 which is fluidly connected at a suction end to storage tank 11 by suction pipe 21 and to control valve 20 by discharge piping 22. Discharge piping 22 includes a valve controlled spigot 23 as seen in FIGS. 3–5. Suction pipe 21 is shown to particular advantage in FIG. 5. As can be seen, suction pipe 21 is preferably of a length to permit lift from near the bottom portion of storage tank 11. A pressurized flow of water from a discharge side of pump 18 is directed through discharge piping 22 which is fluidly connected to control valve 20. The pressurized flow is directed through control valve 20 into distributor tube 32, as shown in FIG. 4. Distributor tube 32 terminated near the bottom of media filter vessel 30, and water W percolates through filter media 35A–35E and into freebore 36 before being discharged through outlet 19.

As shown in FIGS. 2–5, media filter vessel 30 is partially contained within housing 31 of water treatment system 10. As seen best in FIG. 4, media filter vessel 30 projects within the interior of storage tank and thus is contained within footprint FP of media filter vessel 30 and water treatment system 10. Pressure is relieved from storage tank 11 at relief 29, seen in FIGS. 2, 3 and 6.

Referring to FIG. 4, maintenance of water treatment system 10 may include back flushing media filter vessel 30. This operation is achieved by connecting outlet 19 to a source of freshwater and discharging the flow through the media 35A–35E back up through distributor tube 32 discharging the flow at valve controlled spigot 23. Referring to FIGS. 3 and 6, junction box 26 provides a location for termination or connection of required electrical conductors.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A water treatment system for treating water from a water source, the water treatment system comprising:
    a water storage tank;
    an inlet manifold including an inlet, a sediment filter fluidly connected between the inlet and the water storage tank, a solenoid valve fluidly connected between the inlet and the water storage tank and an air charging device fluidly connected between the inlet and the water storage tank;
    a chlorination device fluidly connected between the water storage tank and the inlet;
    a pump fluidly connected between a media filter vessel and the water storage tank; and
    a control valve fluidly connected between the water storage tank and the media filter vessel, the control valve adapted to control a flow of water through the media filter vessel to a system outlet.

2. The water treatment system of claim 1 wherein the water storage tank further comprises:
    the water storage tank including a footprint, the footprint substantially equal to a diameter of the water storage tank; and
    the inlet, the chlorination device, the media filter vessel, the pump and the control valve all mounted within the footprint of the water storage tank.

3. The water treatment system of claim 1 wherein the chlorination device further comprises a chlorination basket containing an erodable source of chlorine, the chlorination basket fluidly connected to the water storage tank and the inlet.

4. The water treatment system of claim 1 wherein the erodable source of chlorine further comprises a chlorine tablet.

5. The water treatment system of claim 1 wherein the media filter vessel further comprises the media filter vessel contained at least partially by the water storage tank.

6. The water treatment system of claim 1 wherein the media filter vessel further comprises:
    a first filter media layer including gravel;
    a second media layer including MTM Green Sand;
    a third media layer including activated carbon;
    a fourth media layer including a pH booster;
    a fifth media layer including filter aggregate; and
    a sixth media layer including a freebore.

7. The water treatment system of claim 1 wherein the control valve further comprises:
    a processing device;
    a system memory device conductively connected to the processing device for storing system configuration and operation data; and
    an input device conductively connected to the processing device for inputting system configuration and operation data.

8. The water treatment system of claim 7 wherein the system configuration and operation data further comprises a backflush command.

9. A water treatment system for treating water from a water source, the water treatment system comprising:
    a water storage tank;
    an inlet fluidly connecting the water storage tank to a water source;
    a chlorination device fluidly connected between the water storage tank and the inlet;
    a pump fluidly connected between a media filter vessel and the water storage tank;
    a control valve fluidly connected between the water storage tank and the media filter vessel, the control valve adapted to control a flow of water through the media filter vessel to a system outlet;
    the water storage tank including a footprint, the footprint substantially equal to a diameter of the water storage tank; and
    the inlet, the chlorination device, the media filter vessel, the pump and the control valve all mounted within the footprint of the water storage tank.

10. The water treatment system of claim 9 further comprising an inlet manifold including the inlet, a sediment filter fluidly connected to the inlet, a solenoid valve fluidly connected to the inlet, an air charging device fluidly connected to the inlet, the inlet manifold fluidly connected to the chlorination device and the storage tank.

11. The water treatment system of claim 9 wherein the chlorination device further comprises a chlorination basket containing an erodable source of chlorine, the chlorination basket fluidly connected to the water storage tank and the inlet.

12. The water treatment system of claim 11 wherein the erodable source of chlorine further comprises a chlorine tablet.

13. The water treatment system of claim 9 wherein the media filter vessel further comprises:
    a first filter media layer including gravel;
    a second media layer including MTM Green Sand;
    a third media layer including activated carbon;
    a forth media layer including a pH booster;
    a fifth media layer including filter aggregate; and
    a sixth media layer including a freebore.

14. The water treatment system of claim 9 wherein the control valve further comprises:
    a processing device;
    a system memory device conductively connected to the processing device for storing system configuration and operation data; and
    an input device conductively connected to the processing device for inputting system configuration and operation data.

15. The water treatment system of claim 14 wherein the system configuration and operation data further comprises a backflush command.

* * * * *